United States Patent [19]

Gomez

[11] 3,947,431

[45] Mar. 30, 1976

[54] COMPOUNDING NITRILE POLYMERS TO REDUCE THE EXTRACTABLE HCN WITH A FORMALDEHYDE COMPOUND

[75] Inventor: I. Luis Gomez, Longmeadow, Mass.

[73] Assignee: Monsanto Company, St. Louis, Mo.

[22] Filed: Apr. 24, 1974

[21] Appl. No.: 463,441

[52] U.S. Cl. ........... 260/85.SS; 260/4 R; 260/4 AR; 260/83.3; 260/85.5 R; 260/85.5 HC; 260/85.5 ES; 260/88.7 R; 260/88.7 A; 260/88.7 B; 260/876 R; 260/879; 260/881; 426/106

[51] Int. Cl.$^2$........... C08F 220/42; C08F 220/70; C08F 120/42; C08F 120/70

[58] Field of Search .. 260/88.7 R, 88.7 A, 85.5 HC, 260/88.7 B, 85.5 S, 876, 877; 426/106

[56] References Cited
UNITED STATES PATENTS

| | | |
|---|---|---|
| 3,451,538 | 6/1969 | Trementozzi .................. 260/85.5 X |
| 3,540,577 | 11/1970 | Trementozzi et al. ............... 426/106 |
| 3,615,710 | 10/1971 | Lee et al. ........................ 260/85.5 X |
| 3,821,177 | 6/1974 | Chan .............................. 260/85.5 R |

FOREIGN PATENTS OR APPLICATIONS

| | | |
|---|---|---|
| 772,503 | 5/1972 | Belgium |
| 994,033 | 6/1965 | United Kingdom ................ 260/85.5 |

*Primary Examiner*—Joseph L. Schoefer
*Assistant Examiner*—Herbert J. Lilling
*Attorney, Agent, or Firm*—Eugene Zagarella, Jr.; William J. Farrington

[57] ABSTRACT

A method for compounding a nitrile polymer with a formaldehyde compound in order to reduce the extractable HCN content of the nitrile polymer which process comprises blending a formaldehyde compound and a particulate nitrile polymer at a temperature in the range of from 125°F. to 300°F. (52°C. to 149°C.) and then purging the blend.

19 Claims, 2 Drawing Figures

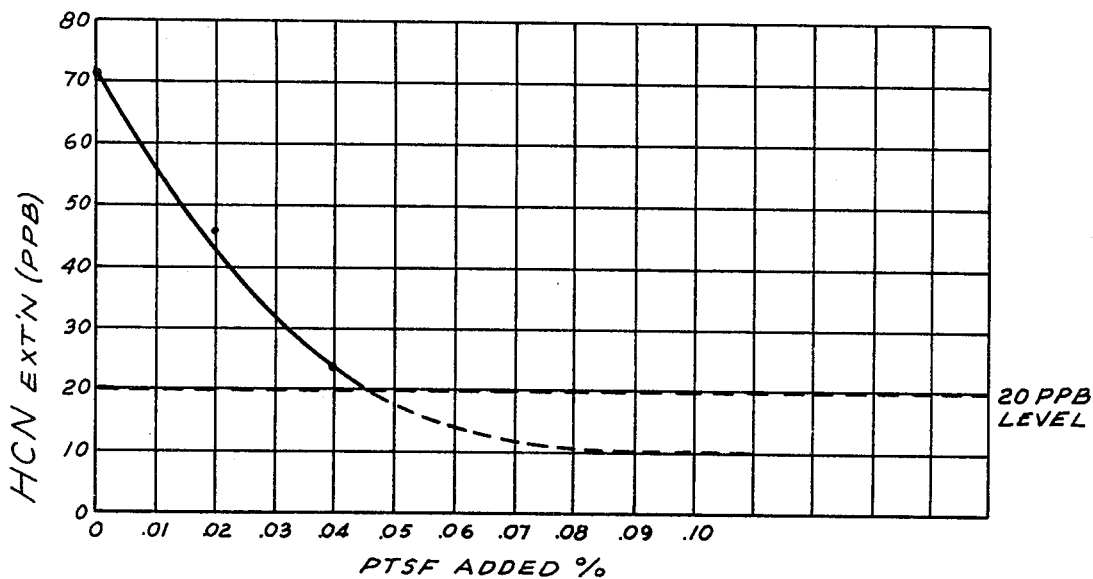
Fig.1. HCN EXTRACTION VS. LEVEL OF PTSF ADDED TO POLYMER
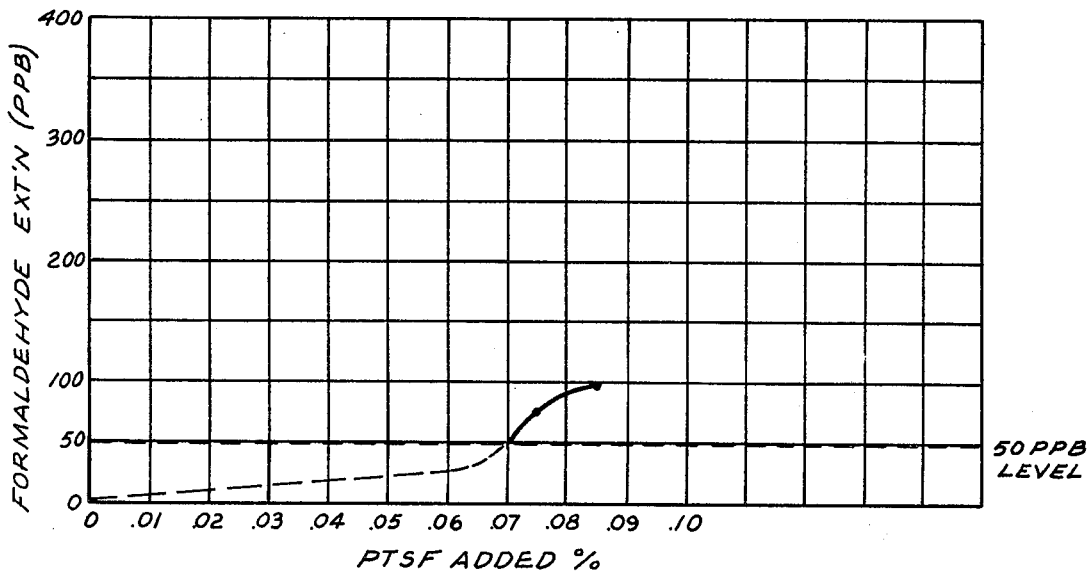
Fig.2. FORMALDEHYDE EXTRACTION VS. LEVEL OF PTSF ADDED TO POLYMER

COMPOUNDING NITRILE POLYMERS TO REDUCE THE EXTRACTABLE HCN WITH A FORMALDEHYDE COMPOUND

BACKGROUND OF THE INVENTION

1. Field of the Invention

The present invention relates to an improved process for compounding nitrile polymers with a formaldehyde compound in order to reduce the extractable HCN content of packaging materials made from the nitrile polymer.

2. Description of the Prior Art

In recent years it has been discovered that certain polymeric nitrile resins are especially suitable for packaging applications because of their excellent water and oxygen barrier properties. Such polymers are described at length in U.S. Pat. Nos. 3,451,538 and 3,615,710, among others. Even more recently it has been discovered that although such nitrile polymers have excellent barrier properties they may be unsuitable for certain packaging applications because they contain trace, though detectable, amounts of hydrogen cyanide (HCN) which may be extracted by and impart a taste to the contents of the package.

The amount of HCN in such nitrile polymers will vary with the nitrile monomer, the total nitrile content of the polymer, the polymerization method used to prepare the polymer, the processing and thermal history of the polymer and other factors. Moreover, it has been found that the amount of extractable HCN in nitrile polymers may be increased after the polymer has been subjected to forming operations wherein the polymer has been heated in order to soften and/or melt the polymer prior to forming it into shaped articles.

The trace amount of extractable HCN present in such nitrile packaging materials is very low and presents no known health or safety problems. In fact, the amount of extractable HCN in such nitrile polymers is lower than that found in many foods. In this regard it should be noted that HCN is a natural component in many foods and many other foods such as cereals, cocoa, ham, bacon and sausage, which are fumigated with HCN (prussic acid), are permitted to contain from 50 to 200 parts per million of HCN. (See the Food Additive Regulations of the FDA (page 3, Subpart D, Paragraph 121, 1072) as published in the Federal Register: Dec. 23, 1965; 30 F.R. 0.15912 and the 1962 Public Health Service Publication 956 "Drinking Water Standards".).

However, as stated above, the HCN in certain nitrile packaging materials may, in certain instances, be extracted and impart a taste to the contents of the package. The problem of HCN extraction as it affects taste, is of concern in the packaging of beverages which are in prolonged intimate contact with the container. In these packaging applications the probability of HCN extraction is very high.

Recently, it has been discovered that the extractable HCN content of packaging materials prepared from high nitrile polymers can be reduced by compounding the nitrile polymer with a formaldehyde compound prior to the fabrication of the packaging material as is disclosed in U.S. Pat. application Ser. No. 323,771, filed Jan. 15, 1973 and now U.S. Pat. No. 3,870,802. However, even more recently it has been discovered that in certain instances excess formaldehyde may remain in the packaging material. For certain food packaging applications, it may be desirable to reduce the level of extractable formaldehyde to less than 200 parts per billion.

The present invention discloses an improved method for compounding a high nitrile polymer with a formaldehyde compound in order to reduce the extractable HCN content of packaging materials prepared from the nitrile polymer, while maintaining the extractable formaldehyde content below certain levels.

SUMMARY OF THE INVENTION

The present invention relates to a method for compounding a nitrile polymer with a formaldehyde compound, which method comprises (a) blending a particulate nitrile polymer and a formaldehyde compound in a closed apparatus at temperatures in the range of from 125°F. to 300°F. (52°C. to 149°C.) for a time sufficient to obtain an intimate blend, (b) then venting the blender in order to remove any free or uncombined formaldehyde, such that the extractable HCN content of packaging materials prepared from the compounded nitrile polymer is less than 50 and preferably less than 20 parts per billion (PPB), as determined using a 3.0% acetic acid solution as an extracting liquid and an extraction time of 5 days at 120°F. (49°C.) and the extractable formaldehyde content is less than 200 and preferably less than 100 PPB.

DESCRIPTION OF THE DRAWINGS

FIG. 1 is a plot of HCN extraction versus the level of paratoluene sulfonamide formaldehyde (PTSF) condensate added to an acrylonitrile/styrene polymer containing 70% acrylonitrile and 30% sturene.

FIG. 2 is a plot of formaldehyde extraction versus the level of paratoluene sulfonamide formaldehyde (PTSF) condensate added to an acrylonitrile/styrene polymer containing 70% acrylonitrile and 30% styrene.

PREFERRED EMBODIMENTS

It is preferred in the practice of the processes of this invention to employ nitrile polymers, as defined herein, having an extractable HCN content in excess of 50 PPB and to reduce such HCN content below 50 PPB. More preferably, one would employ nitrile polymers having an extractable HCN content in excess of 20 PPB and reduce such HCN content below 20 PPB. The extractable HCN content, as referred to in the preceding sentences, is the HCN extracted from the polymer after heating and shaping the polymer per se, e.g., in the absence of a formaldehyde compound, using an extraction period of 5 days and 120°F. (49°C.) in accordance with the test procedures hereinafter described. However, it is also possible to employ nitrile polymers containing 50 PPB or less of extractable HCN and reduce such HCN content to lower levels by the practice of this invention.

The high nitrile packaging materials used in the present invention contain from 55% to 85% by weight of a nitrile monomer unit, based on the total polymer weight, wherein the weight percent of nitrile monomer is calculated as acrylonitrile. The nitrile monomers include acrylonitrile, methacrylonitrile, ethacrylonitrile, propacrylonitrile, glutaronitrile, methyleneglutaronitrile, fumaronitrile, etc., as well as mixtures of these monomers. The preferred monomers which are interpolymerized with the nitrile monomers include aromatic monomers such as styrene and alpha-methylstyrene; lower alpha-olefins containing 2 to 6 carbon atoms such as ethylene, propylene, butylene, isobutylene, etc.; acrylic acid and methacrylic acid and the corresponding acrylate and methacrylate esters containing 1 to 4 carbon atoms such as methyl acrylate, ethyl acrylate, propyl acrylate, butyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing.

Optionally, the high nitrile packaging materials may contain from 0–25% by weight of a synthetic or natural rubber component such as polybutadiene, isoprene, neoprene, nitrile rubbers, acrylate rubbers, natural rubbers, acrylo-nitrile-butadiene copolymers, ethylene-propylene copolymers, chlorinated rubbers, etc., which is used to strengthen or toughen the high nitrile packaging materials. This rubbery component may be incorporated into the polymeric packaging material by any of the methods which are well known to those skilled in the art, e.g., direct polymerization of monomers, grafting the nitrile monomer onto the rubbery backbone, polyblend of a rubber graft polymer with a matrix polymer, etc.

The preferred nitrile polymers for those packaging applications requiring excellent oxygen and water vapor barrier properties in the packaging materials, are those nitrile polymers containing from 55 to 85% by weight, based on the total polymer weight, of nitrile monomer unit selected from the group consisting of acrylonitrile and mixtures of acrylonitrile and methacrylonitrile wherein the methacrylonitrile is present in amounts up to 16% by weight based on the total polymer weight. When acrylonitrile is used as the sole nitrile monomer the preferred range is from 60 to 83% by weight. The preferred comonomers are styrene and alpha-methylstyrene. Also preferred are interpolymers such as acrylonitrile/methacrylonitrile/styrene; acrylonitrile/styrene/methyl vinyl ether and acrylonitrile/styrene/ethyl vinyl ether.

Formaldehyde compounds used in the present invention include free or unreacted formaldehyde, homopolymers of formaldehyde, or other compounds which yield formaldehyde upon heating to the temperature used in the blending steps described herein or else behave as formaldehyde or formaldehyde donors in the presence of the nitrile polymer.

Examples of homopolymers of formaldehyde suitable for use in the present invention include the cyclic polymers such as trioxane and tetraoxane as well as the linear polymers of formaldehyde which comprise the polyoxymethylene glycols and their derivatives. These polymers have the general formula HO $(CH_2O)_n$ H where $n$ is an integer of at least 2. The upper limit for $n$ may be as high as 5000 for certain derivatives of the polyoxymethylene glycols. These polymers are described at length in Walker, J. Frederic, FORMALDEHYDE, 3rd Edition, 2nd Printing, Reinhold Publishing Corp., New York (1967).

Preferred linear homopolymers are those where n has a value in the range of from 8 to 300. Especially preferred homopolymers are those where $n$ has a value in the range of from 8 to 100. These latter polymers are sold commercially as paraformaldehyde. The commercially available paraformaldehyde usually contains 90 to 99% formaldehyde with a minimum of 95% formaldehyde by weight being preferred.

Formaldehyde compounds which yield formaldehyde include alkali metal formaldehyde bisulfites, alkali metal formaldehyde sulfoxylates, etc. such as sodium formaldehyde bisulfite, potassium formaldehyde bisulfite, sodium formaldehyde sulfoxylate, potassium formaldehyde sulfoxylate, monomethylol hydantoin, dimethylol hydantoin, etc.

Other compounds considered here as formaldehyde compounds, which yield formaldehyde upon heating or processing or else behave as formaldehyde or formaldehyde donors include hexamethylenetetramine, 2-nitro-2-methyl-1,3-propanediol, tris(hydroxymethyl)-nitromethane as well as addition products of formaldehyde and at least one other compound and condensates prepared therefrom. Examples of these addition products and condensates include phenol-formaldehyde; urea-formaldehyde condensates including dimethylol ureas and the cyclic derivatives thereof such as ethylene urea-formaldehyde condensates and the uron resins; formaldehyde adducts of saccharides such as those described in U.S. Pat. No. 3,705,146; triazine compounds such as melamine-formaldehyde, benzoguanamine-formaldehyde, etc.; amide-formaldehyde condensates, e.g., such as paratoluene sulfonamide-formaldehyde, methylolacetamide, methylolformamide and methylolacrylamide.

Other suitable formaldehyde compounds which yield formaldehyde or behave as formaldehyde or formaldehyde donors are well known to those skilled in the art and will become apparent upon reading the above.

The preferred formaldehyde compounds are formaldehyde, paraformaldehyde, and resinous condensates of formaldehyde with other compounds especially paratoluene sulfonamide formaldehyde condensate.

The amount of formaldehyde compound used in the present invention is calculated so as to reduce the extractable HCN content of the polymer so that less than 50 parts per billion and preferably less than 20 PPB of HCN is extracted by food or beverages packaged in the container. Stated differently, the amount of such compounds used should be sufficient to provide a container having an acceptably low level of extractable HCN, e.g., below 50 PPB.

The amount of formaldehyde compound employed also should be sufficient to provide a nitrile packaging material having an extractable HCN content below 50 PPB, preferably below 20 PPB, but insufficient to impart a formaldehyde taste or odor to the food or beverage packaged therein. Preferably, the extractable formaldehyde content of the packaging material is below 200 PPB and more preferably below 100 PPB. In the most preferred embodiment the extractable formaldehyde content is below 50 PPB. In general, the amount of formaldehyde required to achieve this reduction in extractable HCN content will be in the range of from 0.005 to 1.0 % by weight based on the weight on the nitrile polymer. In most applications, the amount of formaldehyde will be in the range of from 0.01 to 0.1% by weight. When using a formaldehyde compound which yields formaldehyde or else behaves as formaldehyde or a formaldehyde donor, the amount of such formaldehyde compound is calculated so as to provide an amount of formaldehyde within the above range.

The actual measurement of the amount of HCN and formaldehyde extracted by the extraction liquid is not considered to be a part of this invention. In this regard, any method capable of detecting amounts of HCN as low as 20 PPB and amounts of formaldehyde as low as 50 PPB can be used to measure the amount of extracted HCN and formaldehyde respectively. These methods, which are well known to those skilled in the art, include colorimetric, polargraphic, fluorimetric, gas chromatographic and electrochemical methods.

Tests to determine the amount of extractable HCN and formaldehyde in packaging material prepared from nitrile polymers are run on 10 ounce (296 cc.) beverage bottles. The extraction tests are run for 5 days at 49°C. using a 3% acetic acid solution (an FDA simulant for acid type foods) as the extracting liquid. This illustrates one of the more difficult packaging applications where there is a high probability of extracting HCN and formaldehyde.

In many instances it is more convenient to run HCN extraction tests on molded test samples such as tensile bars or other convenient shapes rather than on bottles or other packaging material. In this event, the ratio of the area of the test sample to extracting liquid should be in the range of 0.13/1 to 0.15/1 in order to simulate extraction tests for most packaging applications.

The compounding operation of the present invention is carried out in a mixing apparatus which is capable of being closed to prevent the uncontrolled release of gaseous formaldehyde. Preferably, the mixing apparatus is equipped with heating means, entry ports for charging the particulate polymer and the formaldehyde compound, which may be in gaseous, liquid or solid form, and with venting and purging means for the controlled release of any free or unreacted formaldehyde which may be present in the apparatus after the blending operation. Preferably, the apparatus is equipped with high speed or high shear blending means in order to insure maximum contact between the nitrile polymer and the formaldehyde compound in the shortest possible time.

Examples of apparatus suitable for use in the present invention include the commercially available ribbon blenders, dry blenders, plow blenders, turbulent mixers, high intensity mixers, etc., which are well known to those skilled in the art.

Preferred blending apparatus are the hurling and whirling type where axially mounted mixing means are used in combination with one or more impellers or mixers mounted at right angles to the axially mounted mixing means. One such preferred type is described in U.S. Pat. No. 3,162,428 to W. Lodige et al., which is incorporated herein by reference, wherein the spray elements are replaced by impellers or mixers. In this apparatus continuously rotating plows force portions of the particles upwardly along and in contact with the heated surface of the blender in a converging mixing pattern while other portions of the particles are diverted out of such a pattern by means of mixers mounted at right angles to the walls of the blender. These mixers rotate with the plows so as to increase the exposed surface area of individual particles.

Especially preferred blending apparatus are those described in U.S. patent application Ser. No. 197,766, filed Nov. 11, 1971 to Gomez et al. and now U.S. Pat. No. 3,831,290 which patent application is incorporated herein by reference.

The particulate nitrile polymer used in the present invention has an average particle size such that it passes through a No. 3 U.S. Standard Sieve and at least 80% of the material is retained on a No. 200 sieve. Preferably, the particle size is such that the particulate polymer will pass through a No. 8 sieve and at least 80% will be retained on a No. 120 sieve. The moisture content of the polymer is preferably less than 1%, more preferably, less than 0.1% by weight, based on the weight of the nitrile polymer. The polymer may be dried to the desired moisture content prior to adding it to the blending apparatus or it may be dried in the blending apparatus when such apparatus is equipped with heating means. Alternately, the compounded polymer may be dried before being fabricated into articles. Preferably, the polymer is dried before it is blended with the formaldehyde compound.

When using solid formaldehyde compounds it is preferred to use finely ground material. Preferably, the solid formaldehyde compound will pass through a No. 8 U.S. Standard Sieve and more preferably, it will pass through a No. 50 sieve.

The blending temperatures used in the present process are in the range of from 125°F. to 300°F. (52°C. to 149°C.) which temperatures are below the normal melting or flow extrusion temperature for the high nitrile polymers. Preferably, the temperatures used are in the range of from 150°F. to 250°F. (66°C. to 121°C.) with temperatures in the range of 180°F. to 240°F. (82°C. to 116°C.) being especially preferred when using the preferred formaldehyde compounds. When using temperatures higher than 250°F. (121°C.) it may be necessary to add an anti-caking agent to prevent sticking or agglomeration of the resin particles.

Preferably, the blending action is maintained during the heating step. However, the blending action may be intermittent provided that it is efficient enough to produce an intimate blend of the polymer and formaldehyde compound when the blend means are activated.

The blending times will vary with the HCN content of the polymers, the formaldehyde compound used, the blending temperatures and the efficiency of the blender. When using lower temperatures, much longer reaction times may be required in order to obtain the desired reduction in the HCN content of the polymer. Preferably, the formaldehyde compounds are added when the temperature of the nitrile polymer is within the range set forth as the effectiveness of the formaldehyde compound is increased at these temperatures over that observed at room temperature. In general, the blending time will range from 2 minutes to 5 hours. When using temperatures in the range of from 180°F. to 240°F. (93°C. to 116°C.) and the preferred formaldehyde compounds, the blending times normally will be in the range of from 5 to 50 minutes.

After the blending operation the blender is vented and purged with a gas to remove substantially all of the free or uncombined formaldehyde. In certain instances, it may be desirable to have a small amount of formaldehyde, e.g., 50 to 100 PPB remaining in the blend in order to reduce any HCN which may be generated in the polymer during the fabrication of the packaging material, e.g., in the extrusion or molding steps wherein the polymer is heated to the melt temperature. Examples of gases which could be used to purge the blender include air, oxygen, carbon dioxide, nitrogen and inert gases such as helium, neon and argon. The preferred gases are air and nitrogen. Preferably, the gases used to purge the blend are dry, i.e., less than 1% of moisture, preferably less than 0.1% moisture in order to avoid the necessity for drying the blend prior to fabricating it into packaging materials. The length of the purging cycle is determined by the reactor used, the flow rates of the purging gases, the amount of blend to be purged, the amount of free formaldehyde to be removed, etc. In general, the purging time will be from 5 minutes to 2 hours. Purging can be carried out while running the blender or with the blending means shut off. Preferably, the blending means are in operation during the purging step.

The compounding or blending operations of the present invention may also be carried out using additive master batch techniques wherein all of the formaldehyde compound to be used is blended with a small portion of nitrile polymer. The resulting master batch is then blended with the remaining portion of polymer and fabricated into packaging materials. Additives such as pigments, stabilizers, plasticizers, etc., which are conventionally used in packaging materials may be added to the master batch along with the formaldehyde compounds. Alternately, they may be added after the compounding of the nitrile polymer with the formaldehyde compound and prior to the molding operation to prepare the packaging materials.

Preferably, a dispersing agent is used in the blending operation in order to increase the efficiency and dispersibility of the formaldehyde compounds. The preferred dispersing agent is a combination of (1) a $C_{12}$ to $C_{28}$ saturated aliphatic fatty acid ester of glyerol or sorbitan; and (2) a polyoxyethylene sorbitan ester.

The glycerol and sorbitan esters used are the full or partial esterification products of either glycerol or sorbitan and a saturated fatty acid containing from 12 to 28 carbon atoms such as lauric, tridecylic, myristic, pentadecylic, palmitic, margaric, stearic nondecylic, arachidic, behenic, lignoceric, cerotic, and montanic acids.

The preferred esters are the mono esters of glycerol and sorbitan wherein the saturated aliphatic fatty acid contains from 16 to 20 carbon atoms with glycerol monostearate and sorbitan monostearate being especially preferred.

The polyoxyethylene sorbitan esters used are polyoxyethylene sorbitan esters of a saturated aliphatic fatty acid containing from 12 to 28 carbon atoms such as those listed above. The polyoxyethylene segment contains from 4 to 30 oxyethylene units with 16 to 24 units being preferred. The sorbitan segment used in both components is a monohydrosorbital having the general formula $C_6H_8O(OH)_4$. These materials, which are well known in the art, are derived from sorbitol by the removal of one molecule of water.

The weight ratio of the glyceryl ester or sorbitan ester to the polyoxyethylene ester used in the present invention is in the range of from 80/20 to 20/80 with a weight ratio of 70/30 to 30/70 being preferred.

The total amount of (1) the glyceryl ester or sorbitan ester, and (2) polyoxyethylene ester used in the present invention is in the range of from 0.01 to 1.0% by weight based on the weight of the nitrile polymer. Preferred amounts are in the range of from 0.01 to 0.5% by weight based on the weight of the nitrile polymer with from 0.01 to 0.1% being especially preferred.

The following examples are set forth in illustration of the present invention and should not be construed as limitations thereof. All parts and percentages of nitrile polymer and formaldehyde compound are by weight unless otherwise specified. The amount of formaldehyde compound used is expressed by weight based on the total weight of the nitrile polymer in the resulting packaging material. The PPB values for extracted HCN refers to nanograms of HCN per gram of extracting liquid.

EXAMPLES 1 to 12

These examples illustrate the use of various formaldehyde compounds in the process of the present invention. The polymer used contains 70% by weight of acrylonitrile and 30% by weight of styrene. The polymer, in particulate form, is charged to a horizontal blender of the type described in U.S. patent application Ser. No. 197,766, filed Nov. 11, 1971 to Gomez et al. which is referred to above. The blender is equipped with entry and outlet means and variable speed blending means. Dry air having a temperature of about 220°F. (104°C.) is swept through the blender while maintaining blending action in order to reduce the moisture content of the polymer to less than 0.1% by weight. Then the air inlet and outlet ports are closed and the formaldehyde compound, in a finely ground state, is charged to the blender along with a conventional antioxidant, conventional pigments and a dispersing agent which is a mixture of a polyoxyethylene(20) sorbitan tristearate and glycerol monostearate (40:60 weight ratio). Then all entry and outlet ports are closed and high speed blending agitation is continued for 15 minutes while maintaining the temperature of the blender at about 200°F. (93°C.). At the end of this time the blender is then vented but not purged.

The compounded nitrile polymer is then molded into 10 ounce (296 cc.) beverage bottles. The amounts of extractable HCN and formaldehyde are measured using a 3% acetic acid solution as the extracting agent and 5 days at 120°F. (49°C.) extracting conditions. In Examples 1 to 5, 11 and 12 the formaldehyde extraction tests are carried out using water as the extracting liquid. In Examples 6 to 10 the formaldehyde extraction tests are carried out using 3% acetic acid as the extracting liquid. The extraction test results are tabulated in Table I below wherein the abbreviation HCHO is used to denote the extractable formaldehyde.

TABLE I

SUMMARY OF EXAMPLES 1–12
HCN EXTRACTION TESTS

| Ex. | Formaldehyde Compound - Amount (1) | | Extractables (PPB) | |
|---|---|---|---|---|
| | | | HCN | HCHO |
| 1 | Control | None | 71 | <50 |
| 2 | paraformaldehyde | 0.005 | 46 | <50 |
| 3 | do. | 0.015 | 42 | <50 |
| 4 | do. | 0.02 | 23 | <50 |
| 5 | do. | 0.03 | <20 | 150 |
| 6 | toluene sulfonamide/ formaldehyde (2) | 0.02 | 46 | <50 |
| 7 | do. | 0.04 | 23 | <50 |
| 8 | do. | 0.06 | <20 | <50 |
| 9 | do. | 0.075 | <20 | 80 |
| 10 | do. | 0.085 | <20 | 90 |
| 11 | dimethylol urea | 0.03 | <20 | <50 |
| 12 | do. | 0.05 | <20 | <50 |

(1) % by weight of formaldehyde compound based on the total weight of the acrylonitrile polymer in the bottle.
(2) Commercially available from Monsanto Company as Santolite MHP — a condensate of paratoluene sulfonamide and formaldehyde (1.1 to 1.0 mole ratio) having a molecular weight of about 600.

The data in the foregoing table indicates the significant reduction in the amount of extractable HCN that is obtained when using the processes of the present invention. The reduction achieved in Examples 6 to 10 is even more remarkable when one considers that the paratoluene sulfonamide condensate contains only about 14–15% by weight of formaldehyde.

The data from Example 6 to 10 are plotted out in FIGS. 1 and 2. FIG. 1 is a plot of the level of extractable HCN (PPB) in the acrylonitrile polymer versus the amount (% by weight) of formaldehyde compound (paratoluene sulfonamide formaldehyde condensate). This figure shows the dramatic decrease in extractable HCN with increasing formaldehyde content. FIG. 2 is a plot of extractable formaldehyde (PPB) in the acrylonitrile polymer versus the amount (% by weight) of formaldehyde which is compounded with the polymer in order to reduce the level of extractable HCN. The amount of extractable formaldehyde content increases with increasing amounts of formaldehyde compounded with the polymer.

EXAMPLES 13 to 16

The following examples illustrate the significant lowering of extractable formaldehyde content that is achieved by purging the blend of polymer and formaldehyde compound after the blending cycle. The general heating and blending procedures used in Examples 1 to 12 above are followed here using paratoluene sulfonamide formaldehyde condensate in combination with the acrylonitrile/styrene polymer used in Examples 1 to 12. In Examples 13 and 15 the resulting blend is purged at the end of the blending cycle with hot dry air (105°C./less than 0.1% moisture) for 10 minutes while no purging step is used in Examples 14 and 16.

The HCN and formaldehyde extraction results for these tests are listed in Table II below.

TABLE II

SUMMARY OF EXAMPLES 13 to 16

| Ex. | Amount (1) | Purging Step | HCN Extraction PPB | Formaldehyde Extraction PPB |
|---|---|---|---|---|
| 13 | 0.085 | Yes | <20 | <50 |
| 14 | 0.085 | No | <20 | 90 |
| 15 | 0.10 | Yes | <20 | <50 |
| 16 | 0.10 | No | <20 | 100 |

(1) % by weight of formaldehyde compound based on the total weight of the acrylonitrile polymer in the bottle.

The above results show that the extractable formaldehyde content of the polymer is reduced significantly by the use of a purging step in accordance with the practice of the present invention.

In like fashion, one skilled in the art can readily determine the appropriate amount of formaldehyde compound to use for any given packaging application.

Similar tests run in the absence of the dispersing agent require slightly larger amounts of formaldehyde compound in order to obtain an equivalent amount of extractable HCN. Similar tests run at room temperature (about 25°C.) using toluene sulfonamide formaldehyde condensate indicate that at the lower temperatures more of the formaldehyde condensate and/or longer blending times are required to achieve a comparable reduction in the HCN level of the polymer.

TASTE TESTS

Taste tests are conducted using 10 ounce bottles which were formed as outlined above from various acrylonitrile/styrene copolymers containing 70% by weight acrylonitrile and 30% by weight styrene. The nitrile polymers are blended with various amounts of paraformaldehyde, paratoluene sulfonamide formaldehyde condensate or dimethylol urea and the resulting blends are formed into 10 ounce bottles of the type conventionally used for soft drinks using the procedure outlined above. The bottles are filled with 10 ounces of a well-known commercially available cola beverage (Coca-Cola) and placed in an oven for 7 days at 100°F. (38°C.) along with the same beverage in a glass bottle. At the end of this period, the contents of the plastic bottles are poured into each of 10 unmarked vessels and the contents of the glass bottles are poured into each of 20 unmarked vessels. Five persons previously trained in taste-test techniques and sensitive to detecting taste due to extracted HCN are chosen to act as a taste panel. Each member of the panel is given two sets of two of the vessels containing the cola beverage from the glass bottle and one vessel containing the cola beverage from the plastic bottle. The tasters do not know which one of the three vessels contain the beverage from the plastic bottle and are asked to determine whether one of the three samples has a taste/odor different from that of the other two, and, if so, to designate which one. This is known as a "Triangle Taste Test". If a panel detects a taste difference due to HCN in the beverage packaged in a plastic bottle, the plastic bottle is deemed to "fail" the taste test.

The results of these tests are summarized in Table II below.

TABLE II

SUMMARY OF TASTE TESTS ON 10 OUNCE BOTTLES

| Ex. | Formaldehyde Compound | Amount of Aldehyde (1) | Amount of Extractable HCN (PPB) | Taste Test Results | |
|---|---|---|---|---|---|
| 13 | Control | None | 71 | HCN detected | Fail |
| 14 | paraformaldehyde | 0.005 | 46 | HCN detected | do. |
| 15 | do. | 0.015 | 42 | Slight HCN detected | do. |
| 16 | do. | 0.02 | 23 | No HCN detectable | Pass |
| 17 | do. | 0.03 | < 20 | No HCN detectable | do. |
| 18 | toluene sulfonamide/formaldehyde(2) | 0.01 | 46 | HCN detected | Fail |
| 19 | do. | 0.040 | 23 | No HCN detectable | Pass |
| 20 | do. | 0.06 | < 20 | No HCN detectable | do. |
| 21 | do. | 0.075 | < 20 | No HCN detectable | do. |
| 22 | do. | 0.085 | < 20 | No HCN detectable | do. |
| 23 | dimethylol urea | 0.03 | < 20 | No HCn detectable | do. |
| 24 | do. | 0.05 | < 20 | No HCN detectable | do. |

(1) by weight of formaldehyde compound based on the total weight of the acrylonitrile polymer in the bottle.

The data in Table II clearly show the improvements in HCN taste properties that are obtained when the extractable HCN content of the packaging material is reduced to less than 20 PPB using a formaldehyde compound in accordance with the teachings of the present invention. Similar tests show that extractable formaldehyde levels below 200 PPB do not normally impart a readily detectable taste to cola beverages.

The present invention also contemplates the use of other additives and ingredients in the polymeric composition which do not adversely effect the taste properties of the resulting packaging materials. Examples of these ingredients include thermal stabilizers, light stabilizers, dyes, pigments, plasticizers, fillers, antioxidants, lubricants, extrusion aids, etc.

It is obvious that many variations may be made in the products and processes set forth above without departing from the spirit and scope of this invention.

What is claimed is:

1. In the method for compounding a high nitrile polymer containing from 55 to 85% by weight of a nitrile monomer unit based on the total polymer weight and wherein the weight percent of nitrile monomer is calculated as acrylonitrile, with a formaldehyde compound in order to prepare packaging materials with reduced levels of extractable HCN, the improvement which comprises blending said nitrile polymer with said formaldehyde compound and then purging the blend with a gas having less than 1% of moisture content to reduce the extractable formaldehyde content of packaging material prepared from the blend to below 200 parts per billion.

2. The improved method of claim 1 wherein said nitrile monomer is acrylonitrile.

3. The improved method of claim 2 wherein said nitrile polymer contains from 60 to 83% by weight of acrylonitrile.

4. The improved method of claim 2 wherein said nitrile polymer includes a styrene comonomer.

5. The improved method of claim 4 wherein the nitrile polymer further contains a rubber component.

6. The improved method of claim 1 wherein air is used to purge the blend.

7. The improved method of claim 1 wherein nitrogen is used to purge the blend.

8. In the method for compounding a high nitrile polymer containing from 55 to 85% by weight of a nitrile monomer unit based on the total polymer weight and wherein the weight percent of nitrile monomer is calculated as acrylonitrile with a formaldehyde compound in order to prepare packaging materials with a level of extractable HCN, the improvement which comprises:
 A. Blending the nitrile polymer and the formaldehyde compound in a closed blending apparatus using high intensity mixing at temperatures in the range of from 125°F. to 300°F. (52°C. to 149°C.) for a time ranging from 2 minutes to 5 hours; and then
 B. Purging the resulting blend with a gas having less than 1% moisture content in order to reduce the extractable formaldehyde content of packaging material prepared from the blend to a level below 100 parts per billion (PPB).

9. The improved method of claim 8 wherein the formaldehyde compound is selected from the group consisting of paraformaldehyde, dimethylol urea and paratoluene sulfonamide formaldehyde condensates.

10. The improved method of claim 8 wherein the temperatures used are in the range of from 180°F. to 240°F. (82°C. to 116°C.).

11. The improved method of claim 8 wherein dry air is used to purge the blend.

12. The improved method of claim 8 wherein nitrogen is used to purge the blend.

13. In the method for compounding an acrylonitrile/styrene polymer which contains from 55 to 85% by weight, based on the total polymer weight, of acrylonitrile with from 0.005 to 1.0% by weight, based on the weight of the polymer, of a formaldehyde compound, in order to prepare packaging materials with a reduced level of extractable HCN, the improvement which comprises:
 A. Blending the polymer and the formaldehyde compound in a closed blending apparatus using high intensity mixing at temperatures in the range of from 180°F. to 240°F. (82°C. to 116°C.) for a time ranging from 2 minutes to 5 hours; and then
 B. Purging the blending apparatus with a gas having less than 1% moisture content to remove uncombined formaldehyde.

14. The improved method of claim 13 wherein the formaldehyde compound is selected from the group consisting of paraformaldehyde, dimethylol urea and paratoluene sulfonamide formaldehyde condensate.

15. The improved method of claim 14 wherein the blending time ranges from 5 to 50 minutes.

16. The improved method of claim 14 wherein a dispersing agent is used to facilitate blending the nitrile polymer and the formaldehyde compound.

17. The improved method of claim 14 wherein the amount of formaldehyde compound used is in the range of from 0.01 to 0.1% by weight based on the weight of the polymer.

18. The improved method of claim 13 wherein dry air is used to purge the blend.

19. The improved method of claim 13 wherein nitrogen is used to purge the blend.

* * * * *

UNITED STATES PATENT AND TRADEMARK OFFICE
CERTIFICATE OF CORRECTION

PATENT NO. : 3,947,431
DATED : March 30, 1976
INVENTOR(S) : I. Luis Gomez

It is certified that error appears in the above-identified patent and that said Letters Patent are hereby corrected as shown below:

Col. 2, line 33, after "30%" delete "sturene" and insert --- styrene ---.

Col. 8, line 35, before "conditions" delete "extracting" and insert ---extraction---.

Col. 11, line 33, claim 4, after "claim" delete "2" and insert --- 3 ---.

Col. 11, line 46, claim 8, before "level" insert --- reduced ---.

Signed and Sealed this eighth Day of June 1976

[SEAL]

Attest:

RUTH C. MASON
Attesting Officer

C. MARSHALL DANN
Commissioner of Patents and Trademarks